United States Patent
Swayne et al.

(10) Patent No.: US 11,457,651 B1
(45) Date of Patent: *Oct. 4, 2022

(54) AIR SOUS-VIDE

(71) Applicant: Electrolux Home Products, Inc., Charlotte, NC (US)

(72) Inventors: Steven Swayne, Nashville, TN (US); Brendan McGinnis, Russellville, KY (US); Ashish Ainapure, Hendersonville, TN (US); Paolo Faraldi, Forli (IT); Massimo Banzato, Forli (IT)

(73) Assignee: Electrolux Home Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,828

(22) Filed: Jul. 6, 2020

Related U.S. Application Data

(63) Continuation of application No. 15/427,751, filed on Feb. 8, 2017, now Pat. No. 10,721,948.

(51) Int. Cl.
*A23L 5/10* (2016.01)
*A23C 19/09* (2006.01)

(52) U.S. Cl.
CPC ............ *A23L 5/15* (2016.08); *A23C 19/0912* (2013.01); *A23V 2002/00* (2013.01)

(58) Field of Classification Search
None
See application file for complete search history.

(56) References Cited

U.S. PATENT DOCUMENTS

| | | |
|---|---|---|
| 5,582,755 A | 12/1996 | Maher, Jr. |
| 6,018,150 A | 1/2000 | Maher, Jr. |
| 7,750,271 B2 | 7/2010 | Smith et al. |
| 7,755,006 B2 | 7/2010 | Jones et al. |
| D651,034 S | 12/2011 | Eades et al. |
| D651,459 S | 1/2012 | Eades et al. |
| 8,426,777 B2 | 4/2013 | Elston, III et al. |
| 8,674,270 B2 | 3/2014 | Anderson et al. |
| 8,692,162 B2 | 4/2014 | Elston et al. |
| 9,035,224 B2 | 5/2015 | Lim et al. |
| 9,089,005 B2 | 7/2015 | Boedicker et al. |

(Continued)

FOREIGN PATENT DOCUMENTS

| | | |
|---|---|---|
| CA | 2730380 | 1/2010 |
| CA | 2957723 | 2/2016 |

(Continued)

OTHER PUBLICATIONS

Smith, Cecil. "PID Explained for Process Engineers: Part 2—Tuning Coefficients." CEP Magazone, Feb. 2016 retrieved online: <http://web.archive.org/web/20160225174609/https://www.aiche.org/resources/publications/cep/2016/february/pid-explained-process-engineers-part-2-tuning-coefficients> (Year: 2016).*

(Continued)

*Primary Examiner* — Viren A Thakur
(74) *Attorney, Agent, or Firm* — Pearne & Gordon LLP

(57) ABSTRACT

A method performs sous-vide style cooking in an oven cavity of a cooking appliance, where air, not water, serves as the cooking medium. The oven cavity temperature is regulated around a desired final food temperature using a PID algorithm to control a convection heating element and associated fan.

16 Claims, 5 Drawing Sheets

(56) References Cited

U.S. PATENT DOCUMENTS

| | | | |
|---|---|---|---|
| 9,191,998 | B2 | 11/2015 | Hegedis et al. |
| 9,220,362 | B2 | 12/2015 | Eades et al. |
| 9,335,054 | B2 | 5/2016 | Donarski |
| 9,433,233 | B2 | 9/2016 | Lim et al. |
| 9,492,035 | B2 | 11/2016 | Pavel et al. |
| 9,518,744 | B2 | 12/2016 | Heit et al. |
| 9,572,361 | B2 | 2/2017 | Bordin |
| 9,603,477 | B2 | 3/2017 | Hoare et al. |
| 9,609,696 | B2 | 3/2017 | Kataoka et al. |
| 2003/0218002 | A1 | 11/2003 | Fulton |
| 2005/0051534 | A1* | 3/2005 | Kim ............ F24C 7/087 219/494 |
| 2007/0084849 | A1 | 4/2007 | Smith |
| 2013/0092682 | A1 | 4/2013 | Mills et al. |
| 2014/0010600 | A1 | 1/2014 | Green et al. |
| 2014/0021266 | A1 | 1/2014 | Perez |
| 2015/0008216 | A1 | 1/2015 | Pippia |
| 2015/0185712 | A1* | 7/2015 | Byrne ............ A47J 36/00 700/90 |
| 2015/0265090 | A1 | 9/2015 | Pennella |
| 2015/0292749 | A1 | 10/2015 | Kim |
| 2015/0351579 | A1 | 12/2015 | Johncock et al. |
| 2015/0354827 | A1 | 12/2015 | Faraldi |
| 2015/0370267 | A1 | 12/2015 | Boedicker |
| 2015/0374177 | A1 | 12/2015 | Pavel et al. |
| 2016/0220064 | A1 | 4/2016 | Young |
| 2016/0327281 | A1 | 11/2016 | Bhogal et al. |
| 2016/0345767 | A1 | 12/2016 | Cadima |
| 2016/0360578 | A1 | 12/2016 | Lim et al. |
| 2016/0374353 | A1 | 12/2016 | Faraldi et al. |
| 2017/0020324 | A1 | 1/2017 | Young |
| 2017/0027365 | A1 | 2/2017 | Mendonca |
| 2017/0042202 | A1 | 2/2017 | Yin et al. |
| 2017/0074522 | A1 | 3/2017 | Cheng |

FOREIGN PATENT DOCUMENTS

| | | | | |
|---|---|---|---|---|
| DE | 4217749 | A1 * | 12/1993 | ............ H05B 6/645 |
| DE | 10021235 | | 10/2001 | |
| EP | 0579917 | | 1/1994 | |
| EP | 2287533 | | 2/2011 | |
| EP | 2389044 | | 11/2011 | |
| EP | 3124873 | | 2/2017 | |
| GB | 2487739 | | 8/2012 | |
| GB | 2525943 | | 11/2015 | |
| GB | 2525943 | A * | 11/2015 | |
| WO | 199700596 | | 1/1997 | |
| WO | 2009062917 | | 5/2009 | |
| WO | 2013038186 | | 3/2013 | |
| WO | 2013170266 | | 11/2013 | |
| WO | 2015162131 | | 10/2015 | |
| WO | 2015173083 | | 11/2015 | |
| WO | 2016165946 | | 10/2016 | |

OTHER PUBLICATIONS

DOSE: Detecting user-driven operating states of electronic devices from a single sensing point. Ke-Yu Chen; Sidhant Gupta. Journal of Testing and Evaluation, v 39, n 3, May 2011; ISSN: 00903973; DOI: 10.1520/JTE102997; Publisher: American Society for Testing and Materials. https://doi.org/10.1520/JTE102997. 9 pages.

Measurement Method for the Assessment of the Energy Consumption of Cooking Setups. Grossmann, G. and Weiss, C., "Measurement Method for the Assessment of the Energy Consumption of Cooking Setups," Journal of Testing and Evaluation, vol. 39, No. 3, 2011, pp. 431-435, https://doi.org/10.1520/JTE102997. ISSN 0090-3973. 5 pages.

"Ladyandpups"—"How to Easily Sous-Vide in Oven, with or without Water" Sep. 30, 2015. http://ladyandpups.com/2015/03/30/how-to-easily-sous-vide-in-oven-with-or-without-water/.

Electrolux—Sep. 25, 2013. Http://appliancist.com/builtin_ovens/electrolux-sous-vide-cooking-system.html.

Anova—Sous Vide Pumpkin Cheesecake with Gingersnap Crust—Oct. 16, 2015. http://web.archive.org/web/20151016141353/https://recipes.anovaculinary.com/recipe/sous-vide-pumpkin-cheesecake-with-gingersnap-crust.

International Search Report and Written Opinion issued in corresponding PCT application No. PCT/US2018/017350 dated May 11, 2018, 15 pages.

"Eurotherm—PID Control made Easy". Mar. 27, 2016. web.archive.org/web/20160327002648/http://www.eurotherm.com/termperature-control/pid-control-made-easy(2016).

* cited by examiner

AIR SOUS-VIDE

CROSS REFERENCE TO RELATED APPLICATIONS

This application is a continuation of U.S. application Ser. No. 15/427,751, filed on Feb. 8, 2017. This application is incorporated herein by reference.

BACKGROUND

The present disclosure is directed to a food cooking method and apparatus. More specifically, the disclosure is directed to an apparatus and method for sous-vide style cooking.

In French, "sous-vide" means "under vacuum". In this style of cooking, traditionally food is sealed in air-tight or substantially air-tight bags or the like and submersed in a water-bath having a tightly regulated temperature about that of a target finished cooking temperature for the food. With sous-vide cooking, food can be cooked more evenly and can better retain moisture when compared with other forms of cooking that may unevenly apply heat (e.g. at localized regions of the food) at temperatures significantly higher than the target food temperature, or where the food is not sealed in a leak-tight pouch.

BRIEF SUMMARY

According to a first example of the present invention, a method for cooking food includes receiving or selecting a desired final temperature for cooked food; heating an oven cavity in an initial stage according to a proportional-integral-derivative (PID) algorithm, the PID algorithm controlling a heating element for the oven during the initial stage based on a comparison of a measured temperature inside the oven cavity to a first target temperature; thereafter, heating the oven cavity in a final stage according to the PID algorithm, the PID algorithm controlling the heating element during the final stage based on a comparison of the measured temperature inside the oven cavity to a second target temperature; and cooking the food within the oven cavity via a sous-vide method, wherein heated air within the oven cavity during the initial stage and the final stage is the sous-vide cooking medium, wherein the first target temperature is less than said final desired temperature, and wherein during the final stage, the PID algorithm maintains the measured temperature of the oven cavity within a predetermined range of said desired final temperature.

According to a second example of the present invention, the first example further includes: after heating the oven cavity in the initial stage, heating the oven cavity in a first intermediate stage according to the PID algorithm for a first time period, the PID algorithm controlling the heating element during the first intermediate stage based on a comparison of the measured temperature inside the oven cavity to a third target temperature; thereafter heating the oven cavity in a second intermediate stage according to the PID algorithm for a second time period, the PID algorithm controlling the heating element during the second intermediate stage based on a comparison of the measured temperature inside the oven cavity to a fourth target temperature; and thereafter heating the oven cavity in the second stage according to the PID algorithm until the conclusion of cooking the food, the PID algorithm controlling the heating element during the second stage based on a comparison of the measured temperature inside the oven cavity to the second target temperature, wherein the first target temperature, the second target temperature, and the fourth target temperature are different.

DETAILED DESCRIPTION

The present disclosure relates to a sous-vide style cooking apparatus and method. Rather than a traditional water-bath, air is used as the sous-vide cooking medium. As described in more detail below, the apparatus and method herein utilize precise temperature control and high air flow, for example with a PID algorithm and convection heating in an enclosed space such as a cooking oven, to mimic sous-vide style water-bath cooking.

Water-bath sous-vide utilizes primarily conduction to transfer heat to food. Such water-baths have traditionally been utilized for sous-vide because the temperature of a water-bath is easy to regulate in a uniform manner and the primary mode of heat transfer into the food is conduction, with heat transfer via other modalities (convection and radiation) being negligible compared to conduction. In contrast, according to the "air sous-vide" approach described herein air is used as the cooking medium, which results in heat transfer to food primarily via convection. Reliance on convection heating to cook according to a sous-vide method strongly benefits from evenly heated air that can be held tightly about a constant, precise temperature. Such precise temperature control can be achieved using, for example, a proportional-integral-derivative (PID) algorithm to operate heating elements within the cooking cavity.

The air sous-vide approach can be achieved with a cooking range or similar cooking appliance that tightly regulates the temperature of an oven cavity at a set point and evenly, uniformly heats the oven cavity. In general, cooking ranges and ovens have an oven cavity having heating elements (e.g., bake, broil, and convection elements). A controller (e.g., having a processor and memory) controls the power to the heating elements and/or other elements of the range such as convection fans, cooling fans, and a catalytic oven exhaust cleaner (an "air guard") element. A temperature sensor may also be disposed in the cooking range for measuring the temperature of the oven cavity and providing the measured temperature as a feedback signal to the controller. Utilizing these and other elements, the controller may operate the cooking appliance in accordance with a cooking program. In a simple example, the program could be a baking function that turns on and regulates the bake heating element to achieve a desired cavity temperature. More complex cooking programs may be designed to cook food in a sous-vide style, such as the air sous-vide methods described herein. The following description relates to example methods for controlling such elements to achieve a sous-vide cooking method.

Figure 1:
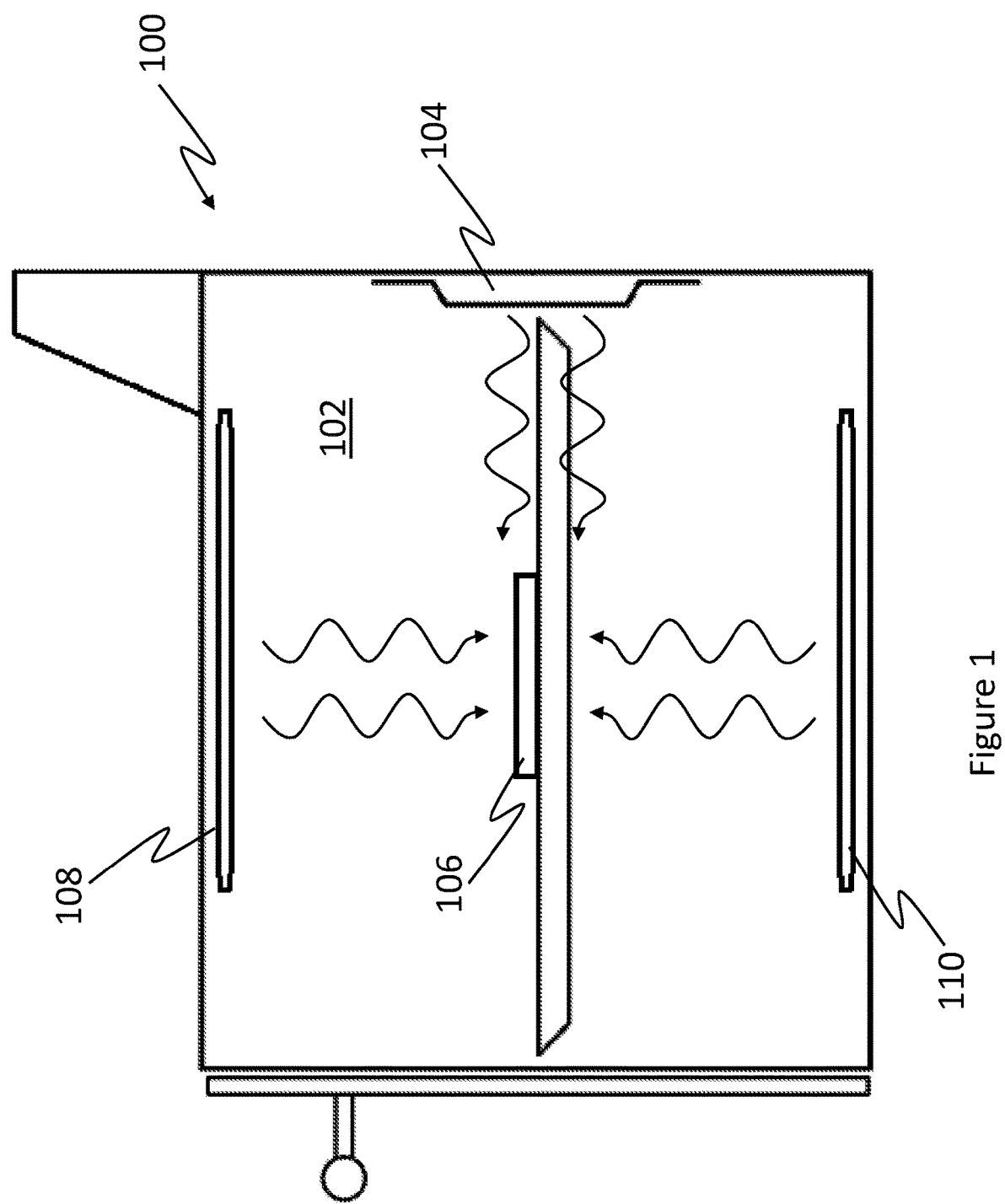
FIG. 1 schematically illustrates a cooking appliance used for air sous-vide style cooking.

A convection heating element is preferably used to heat and control the temperature of the oven cavity in conjunction with one or more convection fans to circulate the heated air within the cavity. FIG. 1 illustrates these features with respect to a cooking appliance 100 having an interior oven cavity 102. Using a convection heating element 104 (and its fan(s)), heat can be generated from a midpoint (e.g., in the middle back of the oven cavity) of the oven cavity 102 where the convection heating element(s) 104 is/are located, and distributed by the adjacent fan(s) throughout the entirety of the cavity 102. Employing a convection fan to circulate air in a small, confined space such as an oven produces substantially uniform air distribution, which saturates the entire cavity 102 with evenly heated air. Additionally, as the convection element 104 is located in the center back of the oven cavity, it is directly exposed to a smaller profile of many foods (e.g., the edge of a steak 106), whereas bake and broil elements 108, 110 at the top or bottom of the cooking cavity 102 are exposed to larger areas of the food (e.g., the face of a stake 106). As a result, the food may be subject to less radiation from the convection element 104 than from a bake or broil elements 108, 110. Such radiation is represented by the wavy arrows emanating from the elements 104, 108, 110 toward the steak 106. Moreover, with such an orientation of the food, there is less relative penetration of radiation into the food than from an element at the top or bottom of the oven cavity (e.g., because a steak is much wider and longer than it is thick). Many other foods, such as those likely to be cooked via a sous-vide method, have similarly low edge-on area profiles relative to their upper or lower surface-area profiles.

While the bake and broil elements may also be used in accordance with the present disclosure, the broil element can often be too powerful for low temperatures (e.g. under about 200° F.) where sous-vide cooking often is carried out. Additionally, as shown in FIG. 1, the broil element may be at the top or above the oven cavity, and the bake element may be at the bottom or below the oven cavity, thereby causing a less even distribution of heat because each of these heats air remote from where a fan can circulate that air in the cavity. For these reasons, use of such elements may be less preferred. Nevertheless, use of the bake, broil, and other elements are also envisioned, and the use of the convection element herein is exemplary, although preferred. In any case, a convection fan can rapidly circulate air within the oven cavity to ensure the most uniform heat distribution throughout the cavity as possible. Coupled with PID algorithms and feedback temperature control to regulate the heating element(s), such uniform air circulation can help ensure a tightly controlled, uniform air temperature within the oven cavity, which is beneficial for sous-vide cooking.

PID Control

In the examples herein, a PID algorithm controls power to the convection element(s) and regulates the convection fan(s) (and/or other elements) according to a duty cycle. For example, the duty cycle for the convection heating elements may be 60 seconds throughout the entirety of the air sous-vide cooking method. During this cycle, the various elements may be on for any duration based on control by the PID algorithm. For example, the duration the element is on is calculated as the product of the duty cycle period and a gain determined by the PID algorithm.

Briefly. the PID algorithm calculates a gain by comparing an error of a detected temperature inside the oven cavity to a target temperature of the algorithm. As will be described in more detail below, the target temperature may be equal to a user inputted set point temperature (e.g., a desired food temperature), or may be offset from such a set point temperature. Alternatively, the target temperature can be preprogrammed into or calculated by the appliance based on a user selection of a particular type of food and desired degree of 'doneness' (e.g. 'steak medium'). The error may be determined as a simple relationship between the detected temperature and the target temperature (e.g., a proportional gain), an accumulated error (e.g., an integral gain), a rate of change of error (e.g., a derivative gain), and/or other similar metrics.

The greater the difference between the temperature of the oven cavity and the target temperature, the longer the heating element(s) will be turned on during each duty cycle. As the temperature of the oven cavity approaches the target temperature, the PID algorithm turns the elements on for a shorter time during each cycle. If the oven temperature is above the target temperature, the elements can remain off until the temperature is reduced below the target temperature and the PID algorithm determines it is appropriate to turn the heating elements back on. This may occur when the PID algorithm calculates a zero or negative gain based on the operative condition or parameters of the oven. The PID algorithm continually recalculates the gain and, therefore, the amount of time each element is on. For example, if the gain is determined to be 0.5 and the duty cycle is 60 seconds, the heating element will be on for 30 seconds (0.5×60 sec) per 60-second cycle; i.e. half of the time.

PID control is generally known in the art and may be implemented in many ways. Indeed, such algorithms may be optimized according to a particular oven's thermal efficiencies and properties. For example, coefficients for the proportional, integral, and derivative gain calculations used in PID control may be tailored according to a particular cooking appliance. While a hysteresis algorithm also may be applied to control the heating elements, hysteresis generally offers less precise temperature control. Such an algorithm may only be able to control the cavity temperature within a wide range (e.g. plus or minus 10-15° F.) about the target temperature as it cycles around the set point. Such temperature variation would generally not provide a tight enough range to accommodate sous-vide style cooking. For example, a 10° F. difference in cooking steak is the difference between rare and medium. Such variance is not acceptable to many consumers. Rather, a range of plus or minus 3° F. or less is desired.

EXAMPLE EMBODIMENTS

Throughout the example methods, a convection element is controlled via a PID algorithm. The method advances linearly through a plurality of cooking stages that help provide efficient heat saturation of the oven cavity, and in turn of the food being cooked. In each stage, a cavity of the cooking appliance is heated to a target temperature of the PID algorithm, the target temperature being equal to a set point temperature plus or minus an offset temperature (which can be 0° F.) for that stage. The set point temperature is based on (and can correspond to) a desired temperature of the finished food product after cooking. For example, if a steak is intended to be cooked to a rare temperature, the set point temperature may be 140° F.

Further, in order to promote even heat distribution throughout the oven cavity, the convection fans are turned on (e.g., at a high speed) preferably during the entireties of the stages. However, they may also be controlled according to a duty cycle in other embodiments. For example, the duty cycle for each fan may only last six seconds to more precisely control their time on relative to that of the heating elements.

First Example

A first example embodiment of an air sous-vide method is now described. During an initial stage, the controller operates according to the PID algorithm to control power to the heating element(s) in order to heat the oven cavity to a first target temperature. Due to the thermal inertia of the heating elements in a cooking system, the target temperature of the PID algorithm can be less than the set point temperature, for example, by about 15 or 20° F. Thus, because the temperature of the cavity may continue to rise above the target temperature once the target temperature is reached and the element(s) deactivated, the temperature of the oven cavity can reach equilibrium at the set point temperature. An additional offset (e.g., −10° F.) of the set point temperature may be included to account for an air guard (a catalytic oven exhaust cleaner) because the air guard can increase the temperature of air in the oven cavity when turned on. In this manner, it is possible to completely or substantially eliminate the overshoot of the set point temperature during heating in the initial stage. This is because heating of the oven cavity, and the corresponding thermal inertia, is reduced as the temperature of the oven cavity approaches the target and set point temperatures.

When the target temperature is achieved, the controller advances to a final stage. According to an example final stage, the PID algorithm controls the heating elements according to a second target temperature. Throughout the final stage, the second target temperature may be equal to the set point temperature, or it may be offset about 5° F. greater than the set point temperature. Indeed various offsets to the set point temperature could be applied to correct for inaccuracies, inefficiencies, or the like associated with a particular cooking appliance. For example, the second target temperature may again be offset by about −10° F. to account for increased heat retention resulting from an air guard. Other conditions that may benefit from a set point temperature offset during the final stage can be determined through routine experimentation on a given appliance, and then incorporated into the associated PID algorithm. Such other conditions can include, for example, the particular insulation efficiency, heat capacity and other thermal properties of the appliance and its components.

Figure 2:
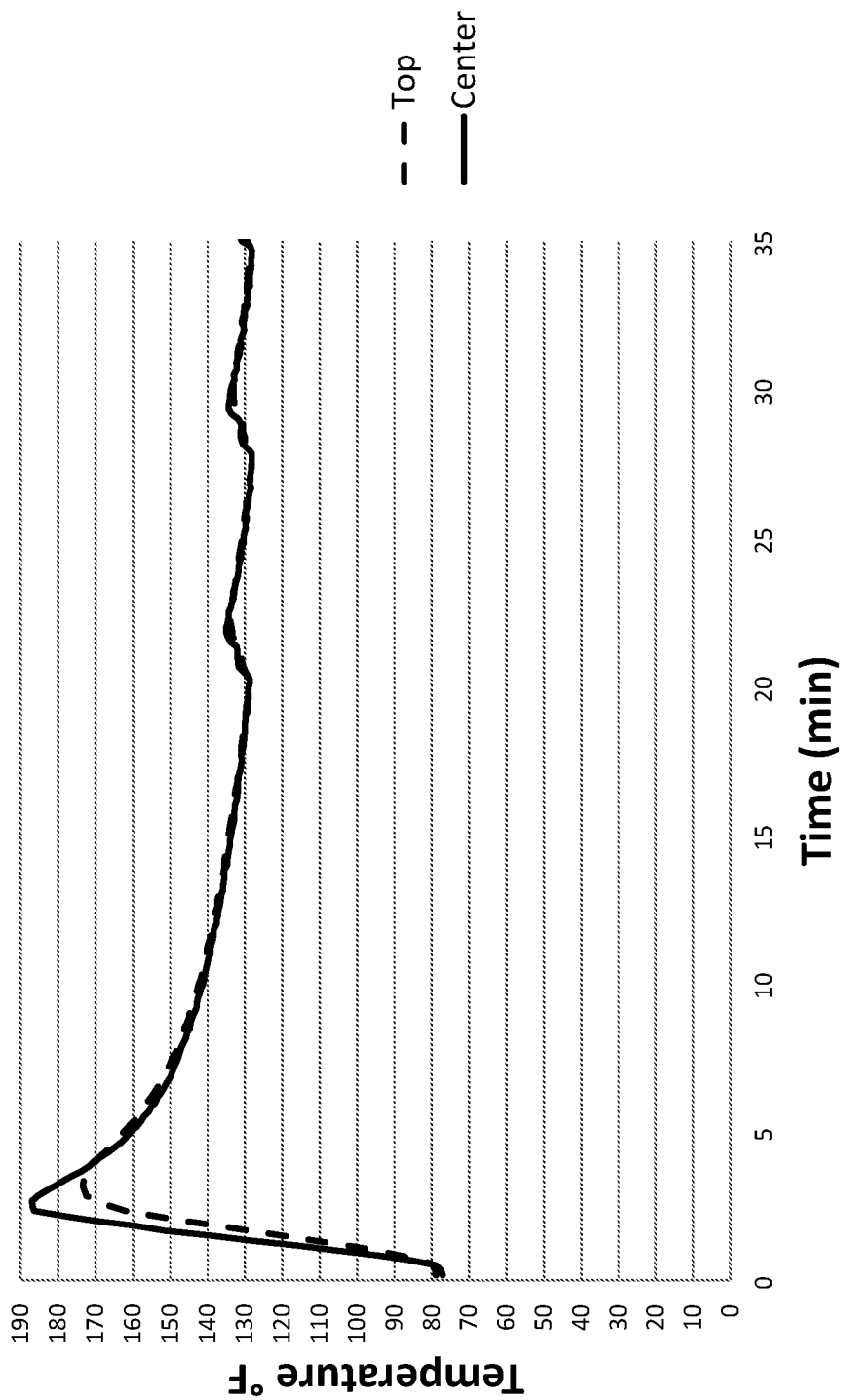
FIG. 2 illustrates a temperature profile of an oven cavity during execution of a first example method at a set point of 130° F.

As a result of using the PID algorithm in this example, the temperature of the oven cavity can be tightly regulated at about the set point/desired cooking temperature. An experimentally determined temperature profile according to the first example is provided in FIG. 2. FIG. 2 illustrates temperatures of the oven cavity taken at a top of the cavity and at a center of the cavity over 35 minutes. In this particular experiment, the set point temperature was 130° F. As can be seen, heating in the initial stage raises the oven cavity to between 170 and 190° F., depending on the location in the oven cavity. After about five minutes, both measured temperatures were substantially the same. After about fifteen minutes they were virtually identical and the cavity temperature stabilized uniformly around the 130° F. set point temperature. When the cavity temperature dropped below 130° F. (about 129° F.), the heating element was turned on according to the PID algorithm as described above and operated according to an appropriate duty cycle taking account of the distance from the target temperature. This raised the cavity temperature to about 135° F. As noted above, when the detected temperature increased above the target temperature, the heating elements were turned off and the cavity cooled back toward the target temperature. Thus, it can be seen that the above-described method tightly regulated oven cavity temperature to within about plus 5° F./minus 1° F. in this example, which is desirable for sous-vide cooking.

Second Example

Figure 3:
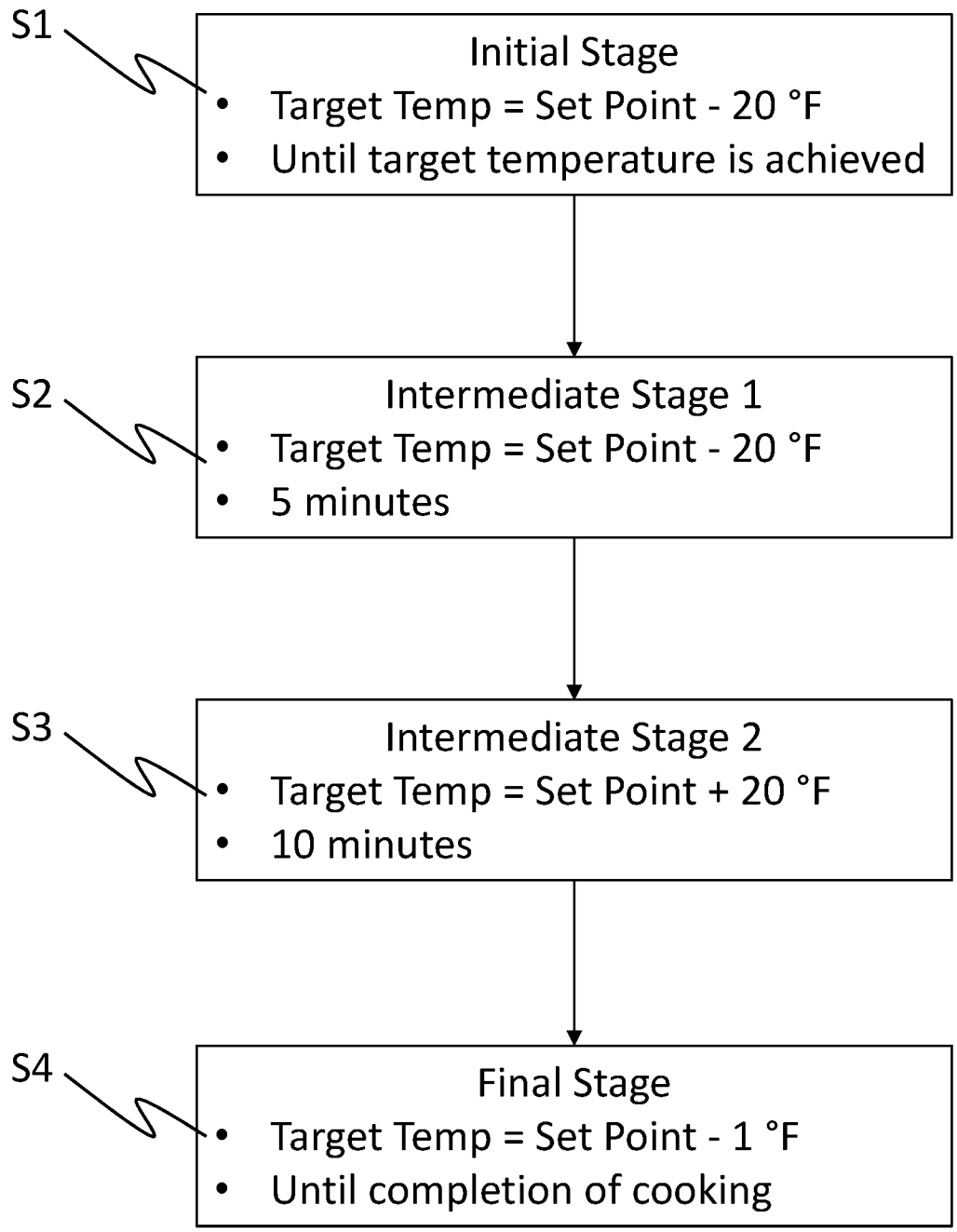
FIG. 3 illustrates a second example method for achieving air sous-vide style cooking.

A second example method, illustrated in FIG. 3, will also be described. As above, in this example method the PID algorithm and convection element are used to tightly regulate oven cavity temperature and the method progresses linearly through a plurality of cooking stages. As in the first example, the method begins with an initial stage S1 that heats a cavity of the cooking appliance to a first target temperature according to a PID algorithm, based on a set point temperature. To account for thermal inertia in this stage, the first target temperature is equal to the set point temperature offset by −20° F. (i.e., reduced by about 20° F.). In other words, the first target temperature is equal to the set point temperature minus 20° F.

Upon reaching the first target temperature, the method enters a first intermediate stage S2. The first intermediate stage S2 is applied for a first time period, which in this example is the first 5 minutes following the initial stage S1. During this first intermediate stage S2, the target temperature of the PID algorithm is a third target temperature. In the illustrated example the third target temperature is again 20° F. less than the set point temperature. A second intermediate stage S3 lasts a second time period, 10 minutes in the illustrated embodiment, following the first intermediate stage S2. In the second intermediate stage S3, the target temperature of the PID algorithm is a fourth target temperature. In this example the fourth target temperature is offset +20° F. from the set point temperature. Following this second intermediate stage S3, a final stage S4 governs the remainder of the air sous-vide cooking in this example. The target temperature of the PID algorithm of the final stage S4 is a second target temperature. The second target temperature is offset −1° F. from the set point temperature. The final stage proceeds until cooking is completed. In some embodiments of the second example, the PID algorithm parameters may depend on the stage. For example, the PID algorithm applied in the second intermediate stage and the final stage may have a lower proportional gain than the initial stage and the first intermediate stage. Such changes can help to reduce overshoot of the oven cavity temperature relative to the target temperature for a given stage and the set point or desired cooking temperatures.

Figure 4:
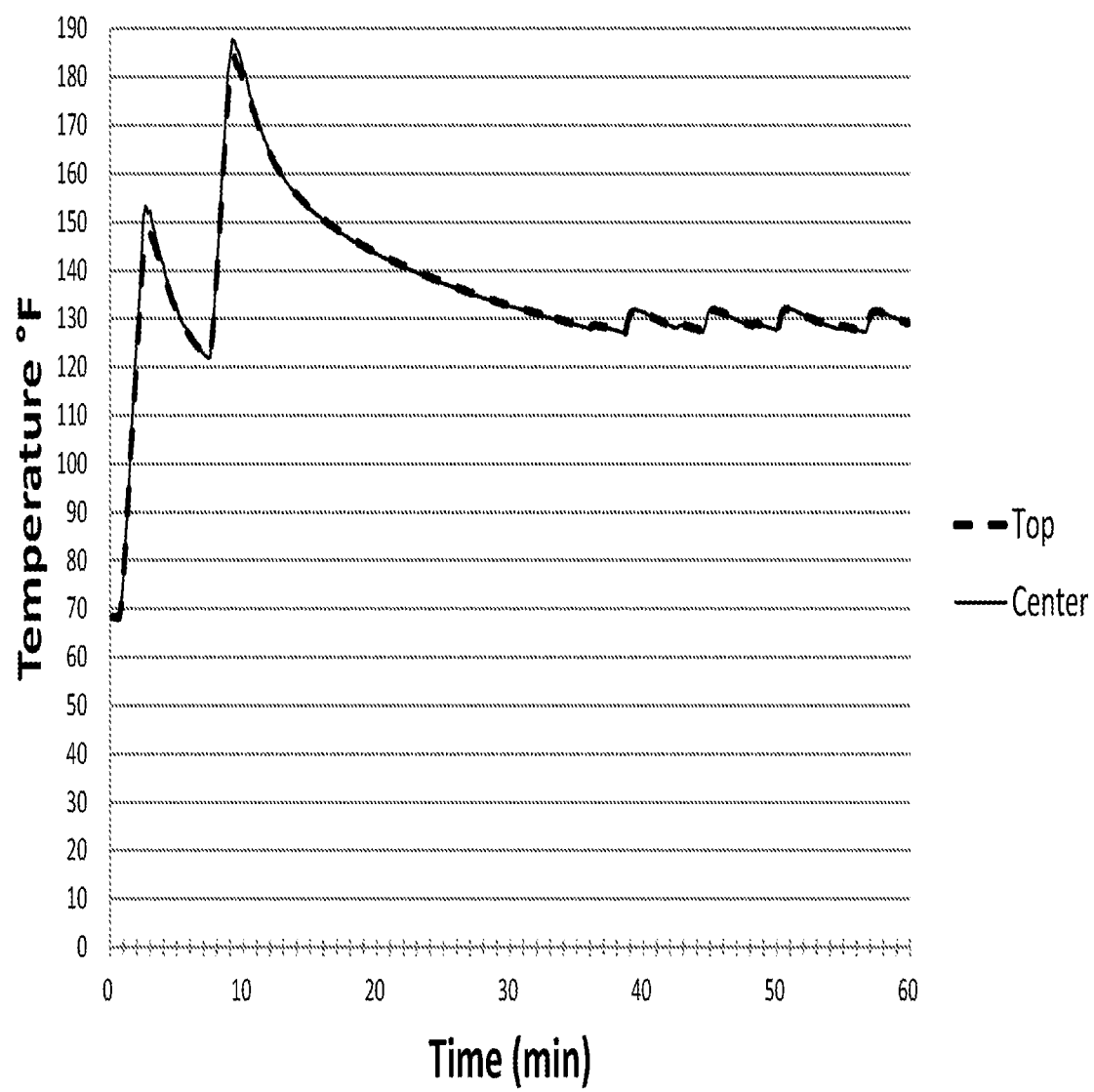
FIG. 4 illustrates a temperature profile of an oven cavity during execution of the second example method at a set point of 130° F.

An experimentally determined temperature profile according to the second example is provided in FIG. 4. FIG. 4 illustrates temperatures of an oven cavity taken at a top of the cavity and at a center of the cavity over 60 minutes. In this example the set point temperature was again 130° F. As can be seen, the initial stage has a target temperature of 110° F. (20° F. below the set point). Upon reaching that temperature, the method transitions to the first intermediate stage. The first intermediate stage, lasting 5 minutes (from about 2 min to 7 min), also has a target temperature of 110° F. Because of overshoot (to about 150° F.) due to thermal inertia, the first intermediate stage allows the oven cavity temperature to decrease back below the set point temperature. In the second intermediate stage, from about 7 min to 17 min, the target temperature is 150° F. (20° F. above the set point). This causes an overshoot to about 185° F., from which the temperature gradually decreases to the set point temperature. The oven cavity is then tightly regulated around the set point temperature of 130° F. for the remainder of cooking in the final stage.

Third Example

A third example is now described. The third example is substantially similar to the second example. However, the target temperatures and PID algorithm parameters depend on a set point temperature. For example, if the set point temperature is greater than 140° F. or 170° F., the PID algorithm target temperature in the initial stage and the first intermediate stage may be 50° F. less than the set point temperature; the offset in the second intermediate stage may be −10° F.; and the offset in the final stage may be −1° F. The proportional gain of the PID algorithm may also be reduced in second intermediate stage and the second stage relative to the first stage and the first intermediate stage, for example. As noted above, such an approach can help reduce the overshoot and limit temperature spikes for higher set point temperatures. Of course, the concepts in this example could be applied for any set point temperature.

Figure 5:
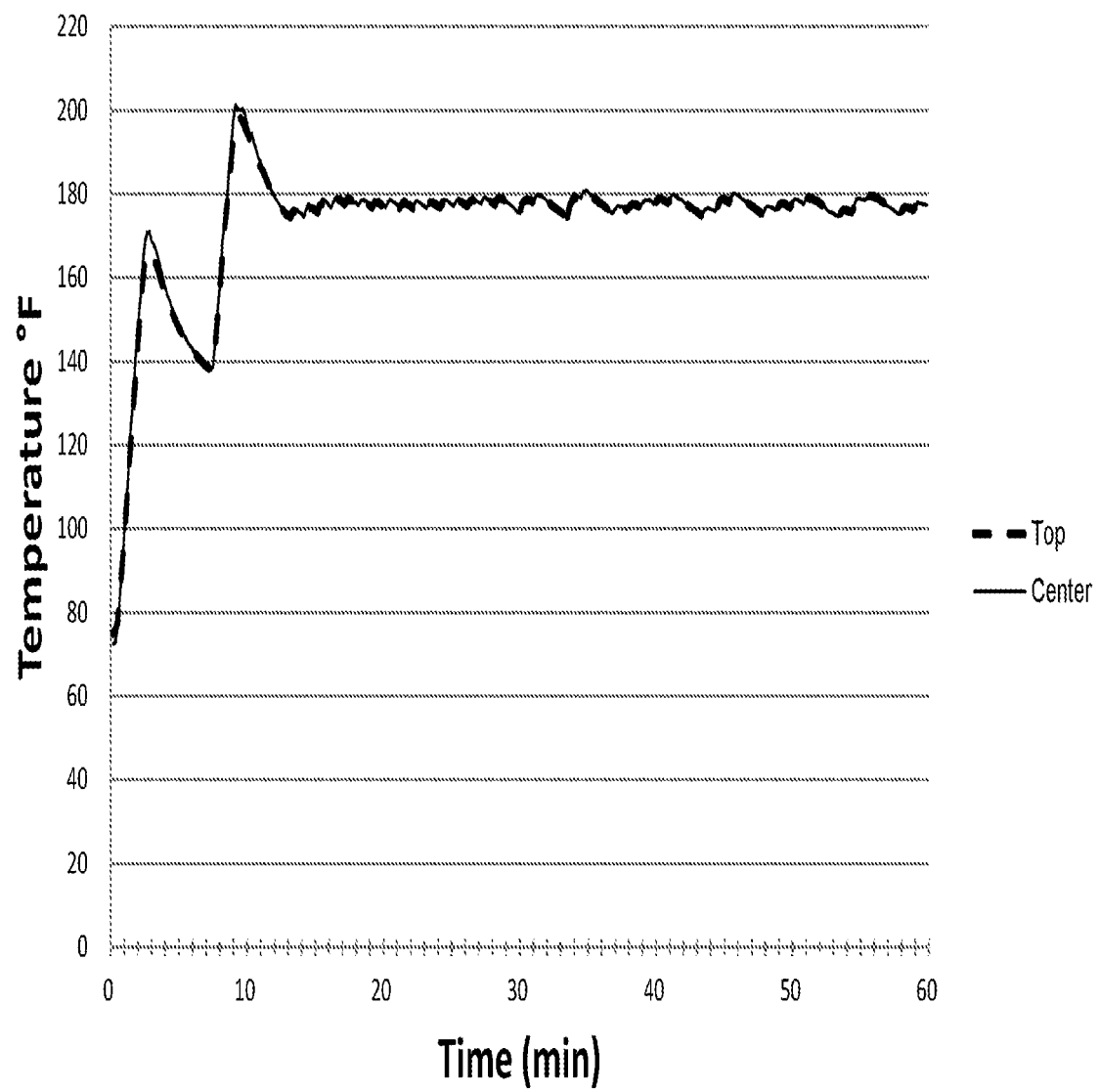
FIG. 5 illustrates a temperature profile of an oven cavity during execution of a third example method at a set point of 180° F.

An experimentally determined temperature profile according to the third example is provided in FIG. 5. FIG. 5 illustrates temperatures of an oven cavity taken at a top of the cavity and at a center of the cavity over 60 minutes. The temperature profile in FIG. 5 is based on a set point temperature of 180° F. Here, the initial stage uses a target temperature of 130° F. (50° F. less than the set point). Upon reaching this temperature, the method transitions to the first intermediate stage for 5 minutes, again having a target temperature of 130° F. Here, the temperature of the oven cavity continues to increase due to thermal inertia but is then allowed to cool to about 140° F. During the second intermediate stage, lasting 10 min (from about 7 min to 17 min), the target temperature is 170° F. (10° F. less than the set point). Finally, the oven cavity temperature is tightly regulated around the 180° F. set point temperature for the remainder of cooking in the final stage. With this approach, overshoot above the set point temperature is limited compared with that in methods illustrated in FIGS. 2 and 4. That is, the oven cavity temperature is only raised to about 20° F. above the set point (about 200° F.), whereas the temperature profiles for a set point of 130° F. included a greater overshoot (about 50° F.).

Application and Results

Using the above described or similar methods in a cooking appliance, users can cook food according to a sous-vide method using air as the medium instead of water. Thus, a user can first season, marinade, or otherwise prepare food and then vacuum or otherwise seal the food in an air tight or substantially air tight container (e.g., a bag). This can be placed directly into an oven cavity to rest on an oven rack for cooking in accordance with the above methods. Just as in a water-bath sous-vide, the food may be placed into the oven cavity at the start of the method, without first requiring the oven to preheat. To effectuate the above-described method on a range or like appliance, a user interface may include an air sous-vide button, which when pressed by a user, executes an air sous-vide cooking method according to a desired set point temperature.

As with conventional water-based sous-vide cooking, there is little to no danger of over-cooking one's food because the air temperature within the oven is set to the desired finished-cooking temperature of the food being cooked. That is, a medium steak cooked via air sous-vide as disclosed herein for 5 hours should exhibit comparable flavor, texture, degree of done-ness and other characteristics as the same steak cooked under the same temperature conditions for 10 hours or even 15 hours. This is because once the food to be cooked (e.g. steak) reaches the steady-state sous-vide temperature, its temperature no longer increases and further cooking does not occur. Rather, the constant-temperature air environment within the oven cavity simply maintains the food at the finished temperature until the user is ready to consume it.

In a comparative test, 12 oz hamburgers (80% lean meat, 20% fat ground chuck) were cooked for two and three hours, at temperatures of 120° F., 140° F., and 160° F. using: 1) an air sous-vide method according to the second example described above implemented on an ELECTROLUX double wall oven; 2) an AEG steam oven sous-vide cooking function; an ANOVA traditional water-bath sous-vide product; and a PARAGON traditional water-bath sous-vide product. The hamburgers were cooked after being removed from a refrigerator, having initial temperatures between 33-39° F. The average temperatures taken immediately following cooking according to each method, time, and temperature are presented in Table 1 below.

TABLE 1

|  | Air | Steam | Water-bath 1 (ANOVA) | Water-bath 2 (PARAGON) |
| --- | --- | --- | --- | --- |
| 120° F. | | | | |
| 2 hours | 118.0° F. | 124.3° F. | 118.8° F. | 108.6° F. |
| 3 hours | 119.0° F. | 119.0° F. | 118.2° F. | 109.9° F. |
| 140° F. | | | | |
| 2 hours | 136.4° F. | 141.8° F. | 127.2° F. | 124.2° F. |
| 3 hours | 138.0° F. | 139.2° F. | 134.0° F. | 131.4° F. |
| 160° F. | | | | |
| 2 hours | 153.2° F. | 161.6° F. | 151.6° F. | 136.6° F. |
| 3 hours | 156.0° F. | 160.4° F. | 151.0° F. | 140.2° F. |

As can be seen, relative to steam, the air sous-vide method cooked the hamburger to comparable temperatures in most of the test conditions. Relative to the first traditional water-bath product, air sous-vide provided comparable temperatures for both times at the 120° F. target temperature, and cooked the food significantly closer to the 140° F. and 160° F. target temperatures for both times. The air sous-vide method provided significantly more accurate temperatures in every instance relative to the second water sous-vide method. It is also noted that the air sous-vide method resulted in the most consistent temperatures (i.e., the smallest range of measured temperatures).

In addition to steaks and other foods traditionally cooked by sous-vide, the above-described methods can be used to cook deserts and other products that typically are immersed for cooking. One example is cheesecake. Traditionally cheesecake is prepared using a water-bath in a conventional oven. The water-bath helps control the temperatures experienced on the sides of the cheesecake pan to help limit overcooking or uneven cooking. Such benefits are similar to those in sous-vide cooking. Providing a set point temperature of 205° F. in the above methods can simulate traditional cooking of a cheesecake in a water-bath. Thus, a user can cook a cheesecake without the complications and difficulties of doing so in a water-bath, while still achieving results similar to those achieved with traditional water-bath methods. A cooking appliance implementing such a feature may be preprogrammed to initiate a cheesecake cooking program in accordance with the above description response to a user input (e.g., pressing a "cheesecake" button provided on a user interface).

Still further, the above-described methods can be used to mimic poaching of food. Poaching is traditionally used for delicate foods such as fish or eggs that tend to disintegrate under other cooking methods. It involves simmering the food in a liquid medium (e.g., water). Poaching is difficult because it involves careful heating and temperature management. Thus, poaching has been traditionally restricted to cooktops. The precise PID control of an oven cavity temperature as described above can provide the requisite temperature control for poaching. Thus, an oven 'air sous-vide' mode as herein described can simulate poaching conditions for delicate foods on a cooktop. Again, a cooking appliance implementing this feature may be preprogrammed to initiate a poaching program in accordance with the foregoing methods in response to a user input.

Of course, many other foods that traditionally rely on a water-bath or the like may be cooked according to the above methods, thereby using an oven cavity to mimic the effects of a water-bath.

Any of the aspects or combination of aspects described above may be implemented or controlled via hardware or software. For example, these aspects may be implemented on a processor or a plurality of processors for controlling power output to various heating elements and fans of a cooking appliance. These processor(s) also may be embedded or integrated with other processors designed for a separate purpose, for example, as part of a central processing unit (CPU) for controlling an entirety of a cooking appliance (e.g., including displays).

A "processor" as used herein refers to any, or part of any, electrical circuit comprised of any number of electrical components, including, for example, resistors, transistors, capacitors, inductors, and the like. The circuit may be of any form, including, for example, an integrated circuit, a set of integrated circuits, a microcontroller, a microprocessor, a collection of discrete electronic components on a printed circuit board (PCB) or the like. The processor may also stand alone or be part of a computer used for operations other than those of a cooking appliance. Implementation of these aspects may by hardware or software may be realized in any number of electronic devices and/or applications, including but not limited to, personal computers, servers, mobile phones, and the like. Moreover, the above aspects and/or combination of aspects may be stored in memory which is executable by one of said processors. It is also to be noted that the above description is non-limiting, and the examples are but only a few of many possible processors and implementations envisioned.

Although the hereinabove described embodiments of the invention constitute preferred embodiments, it should be understood that modifications can be made thereto without departing from the spirit and the scope of the invention as set forth in the appended claims.

What we claim is:

1. A method for cooking food comprising:
   receiving or selecting a desired final temperature for cooked food;
   executing a proportional-integral-derivative (PID) algorithm, an output of the PID algorithm controlling a state of a heating element of an oven cavity of an oven;
   heating the oven cavity according to an initial stage, said output during said initial stage being dependent on an initial target temperature of the oven cavity, said initial target temperature being said desired final temperature modified by an initial offset, wherein the initial offset is constant during the initial stage; and
   thereafter, heating the oven cavity according to a final stage, said output during said final stage being dependent on a final target temperature, said final target temperature being said desired final temperature modified by a final offset,
   wherein the food is cooked within a closed container in the oven cavity via a sous-vide method, air within the oven cavity being a medium for the sous-vide method,
   wherein the initial target temperature is different than the final target temperature.

2. The method according to claim 1, wherein the heating element is a convection heating element associated with at least one convection fan.

3. The method according to claim 1, wherein said output during said final stage maintains a temperature of the oven cavity within a predetermined range of said desired final temperature, the predetermined range being three degrees Fahrenheit below the desired final temperature to three degrees Fahrenheit above the desired final temperature.

4. The method according claim 1, wherein the closed container is a vacuum sealed bag.

5. The method according to claim 1, wherein:
   said output during said initial stage is based on an initial gain value determined by comparing measured temperatures within the oven cavity during said initial stage to said initial target temperature, and
   said output during said final stage is based on a final gain value determined by comparing measured temperatures within the oven cavity during said final stage to said final target temperature.

6. The method according to claim 1, wherein heating in the initial stage ends a predetermined time after a measured temperature inside the oven cavity is equal to or greater than the initial target temperature.

7. The method according to claim 1, wherein a magnitude of the initial offset is between fifteen degrees Fahrenheit and twenty degrees Fahrenheit, such that the initial target temperature is between a value equal to the desired final temperature minus fifteen degrees Fahrenheit and a value equal to the desired final temperature minus twenty degrees Fahrenheit.

8. The method according to claim 1, wherein a magnitude of the final offset is one degree Fahrenheit, such that the final target temperature is equal to the desired final temperature minus one degree Fahrenheit.

9. The method according to claim 1, wherein a magnitude of the initial offset is twenty degrees Fahrenheit, such that the initial target temperature is equal to the desired final temperature minus twenty degrees Fahrenheit, and a magnitude of the final offset is one degree Fahrenheit, such that the final target temperature is equal to the desired final temperature minus one degree Fahrenheit.

10. The method according to claim 1, wherein the food is a cheesecake.

11. The method according to claim 1, wherein the desired final temperature is greater than 140 degrees Fahrenheit, and a proportional gain of the PID algorithm when heating in the final stage is less than a proportional gain of the PID algorithm when heating in the initial stage.

12. The method according to claim 1, wherein:
the desired final temperature is greater than 140 degrees Fahrenheit,
a magnitude of the initial offset is fifty degrees Fahrenheit, such that the initial target temperature is equal to the desired final temperature minus fifty degrees Fahrenheit, and
a magnitude of the final offset is one degree Fahrenheit, such that the final target temperature is equal the desired final temperature minus one degree Fahrenheit.

13. The method according to claim 1, further comprising:
after heating the oven cavity according to the initial stage, heating the oven cavity according to an intermediate stage for a predetermined time period, said output during said intermediate stage being dependent on an intermediate target temperature,
wherein heating in the final stage commences immediately after the oven cavity has been heated according to the intermediate stage for the predetermined time period.

14. The method according to claim 13, wherein heating in the intermediate stage commences after a measured temperature inside the oven cavity is equal to or greater than the initial target temperature.

15. The method according to claim 1, wherein said output controls the state of the heating element according to a duty cycle.

16. The method according to claim 1, wherein the initial target temperature is less than the final target temperature.

* * * * *